United States Patent [19]

Eastman

[11] Patent Number: 4,742,465
[45] Date of Patent: May 3, 1988

[54] CONTROL SYSTEM FOR DOSER ACTUATOR HAVING IMPROVED RESOLUTION

[75] Inventor: James M. Eastman, South Bend, Ind.

[73] Assignee: Allied Corporation, Morristown, N.J.

[21] Appl. No.: 812,050

[22] Filed: Dec. 23, 1985

[51] Int. Cl.⁴ .......................... G05B 11/01; F15B 9/09
[52] U.S. Cl. .................. 364/167; 91/363 R; 318/624; 364/177; 364/183
[58] Field of Search ................ 364/167–171, 364/176, 177, 183, 509, 510; 318/561, 599, 600–603, 624, 632, 611; 91/361, 362, 363 R, 365 A, 417 R, 417 A; 137/596.17

[56] References Cited

U.S. PATENT DOCUMENTS

| | | | |
|---|---|---|---|
| 3,976,925 | 8/1976 | Rudich, Jr. | 318/624 X |
| 4,006,346 | 2/1977 | Pemberton | 364/177 X |
| 4,007,361 | 2/1977 | Martin | 318/561 |
| 4,052,642 | 10/1977 | Speth et al. | 364/177 X |
| 4,256,017 | 3/1981 | Eastman | 137/596.17 X |
| 4,265,163 | 5/1981 | Arao et al. | 91/361 |
| 4,366,743 | 1/1983 | Leszczewski | 318/624 X |
| 4,396,975 | 8/1983 | Kurakake | 364/183 X |
| 4,604,681 | 8/1986 | Sakashita | 364/177 X |

Primary Examiner—Joseph Ruggiero
Attorney, Agent, or Firm—Ken C. Decker

[57] ABSTRACT

The invention is a control system for generating time modulated pulse signals to effect movement of a doser type actuator. The control system is characterized in that it includes an augmenter circuit which generates a first correction signal additive to scheduled control signals when the actuator fails to respond or has a response below a predetermined limit to an actuating pulse, a second correction circuit which generates a correction signal proportional to the magnitude of the first movement of the actuator response to a pulse signal for reducing the magnitude of the pulse signal in proportion to the magnitude of the movement, and a gating signal or circuit which blocks said first and second correction signal generating circuits generating the augmentation signal when the movement of the actuator in response to a pulse signal is negative or above a predetermined limit, when the positional error changes direction, or when the actuator position is within the desired deadband limits.

6 Claims, 3 Drawing Sheets

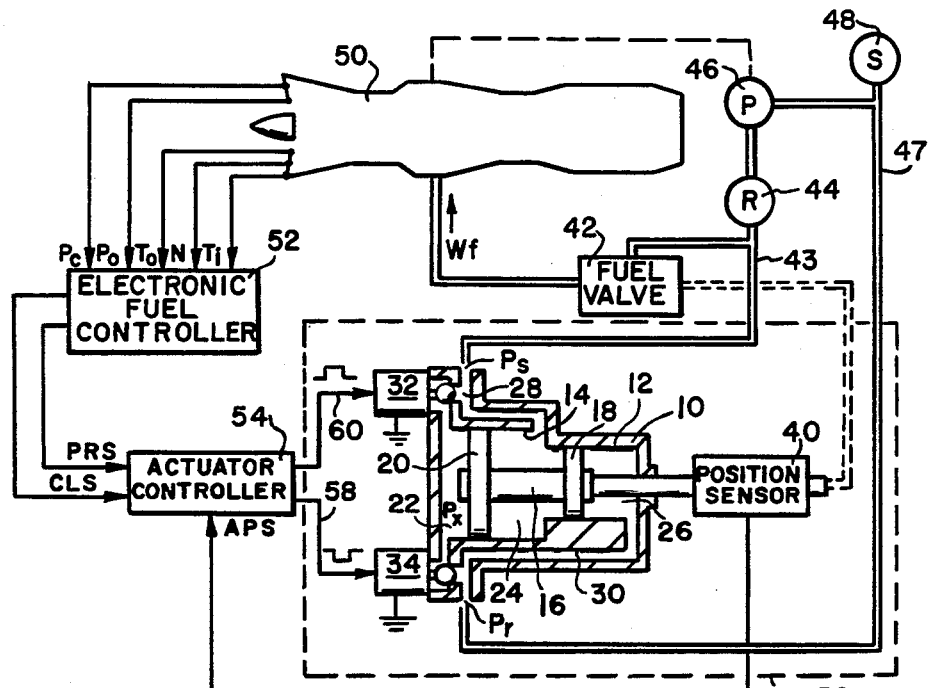
PRIOR ART  FIG. 1
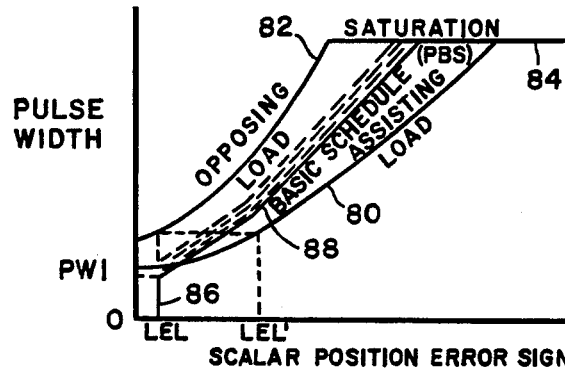
FIG. 2
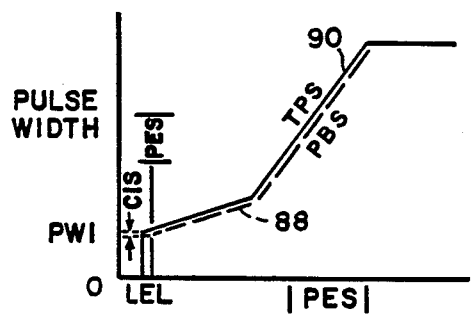
FIG. 2A
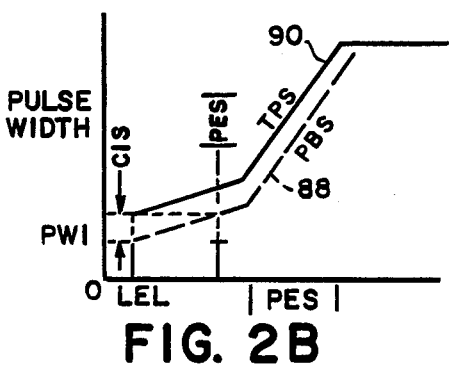
FIG. 2B

CONTROL SYSTEM FOR DOSER ACTUATOR HAVING IMPROVED RESOLUTION

BACKGROUND OF THE INVENTION

The invention pertains generally to a control system for an electro-hydraulic actuator of the doser type and in particular to such a control system which provides improved tracking of position request signals.

Electro-hydraulic actuators of the doser type are known in the art. Such actuators operate by applying or exhausting measured quantities or "doses" of fluid to or from a fluid actuator. Each dose effects movement of the actuator in a manner similar to a stepper motor. The doses are administered in an on-off fashion by means such as solenoid actuated valves.

It is known that the dose volume can be controlled by opening a solenoid valve for a discrete time period in response to an electrical pulse of predetermined duration or width from an electronic controller. The effective output travel rate of the doser actuator can thus be varied by changing the pulse frequency and/or the pulse width with the maximum slew rate of the device being limited by the flow capacity of the solenoid valve when it remains continuously open. Such actuators are compatible with and easily controlled by modern digital electronic controls to effect a stepper motor-like response.

Doser type electro-hydraulic actuators and controls are more fully described in U.S. Pat. No. 4,256,017 in the name of James M. Eastman and assigned to the assignee of the present invention. The disclosure of Eastman is hereby incorporated by reference herein.

A control system for a doser actuator is disclosed in U.S. Pat. No. 4,366,743 issued in the name of Michael J. Leszczewski also assigned to the assignee of the present invention. The disclosure of Leszczewski is hereby incorporated by reference herein.

From these disclosures, it will be recognized that doser actuators do not have inherent digital precision comparable to stepper motors. This is because individual doses cannot be metered with the same precision as the precisely fractionally divided steps of a stepper motor. However, since most control applications utilize closed loop control systems wherein the position of the actuator is the ultimate control parameter, a doser actuator incorporated in a closed loop system can produce actuator position accuracies comparable to those of stepper motors. The doser has advantages of lower cost, reduced complexity, and higher reliability.

An example of an adaptive closed loop control system for an electro-hydraulic actuator is illustrated by U.S. Pat. No. 4,007,361, issued to Martin on Feb. 8, 1977. Such closed loop actuator systems can be used to position various components of turbine engines such as fuel control valves, exhaust nozzles 22, and variable geometry vanes. Additionally, other aircraft uses may include positional control of rotors, elevators, flaps or other components in response to pilot-initiated or automatic control system inputs.

The equilibrium condition for closed loop operation of a doser actuator requires either an error deadband for which no position correction is made or steady state limit cycling wherein the actuator continuously cycles about a desired position. Deadband operation is preferred on most applications because of reduced solenoid operation. In either case, precision of operation depends upon having a small enough minimum doser step or response to accurately move the actuator to its final position. Conversely, as the magnitude of each minimum doser step is reduced, the doser control system tends to exhibit reduced capability with respect to the accuracy of tracking a specific actuator response request. Such problems are further compounded by variations in operation between individual doser actuators, a result of manufacturing tolerances, variations in operating conditions for a specific actuator which may be caused by factors such as temperature, position, altitude, and the like, and variations in response of an actuator to what are commonly referred to as opposing and assisting loads. Accordingly, it is desirable to provide a control system for a doser actuator which is able to supply operating pulse widths for actuation of the doser solenoid valves which have a minimum value which closely approaches the minimum threshold pulse for effecting doser actuation while simultaneously providing such a control system which is able to adapt to larger doser position change requests rapidly and accurately.

SUMMARY OF THE INVFNTION

Broadly the invention is an improvement in a closed loop control system for an electro-hydraulic actuator which includes means for generating a position signal representative of the position thereof and being movable in response to a time modulated pulse signal generated by said control system which is based upon an error signal schedule representative of the difference between the actuator position and a desired actuator position to null the error signal. The time modulated pulse signal includes a threshold component and a component proportional to the error signal. The invention is characterized in that it includes correction signal generating means for generating a first threshold correction signal proportional to the error signal when the actuator fails to move in response to a pulse signal, and second threshold correction signal generating means generating a corrected threshold component as a function of small movements of the actuator in response to pulse signals.

The correction signal circuitry may further include memory circuits for storing signals and a gating circuit for inputting the corrected signals to said time modulated pulse signal generating means for as long as movement of the actuator in response to said pulse signal remains below a predetermined limit. The threshold correction signal generating means generates a signal proportional to the magnitude of the first movement of the actuator in response to a pulse signal and a second summing circuit for reducing the corrected pulse signal threshold as a function of that magnitude.

In a specific embodiment of the invention, the control system further includes disabling circuit means for rendering the pulse signal generating means inoperative when the magnitude of said error signal is less than a predetermined minimum (the deadband).

It is therefore an object of the invention to provide an improved control system for an electro-hydraulic actuator of the doser-type.

Another object of the invention is to provide such an improved control system in which the time modulation of the pulse signal is modified in response to actuator response.

Yet another object of the invention is to provide such a control system wherein the time modulated pulse signal comprises a threshold component and an error component and circuitry for modifying same in response to non-movement and small movement of the actuator to pulse signals.

Another object of the invention is to provide such a system wherein threshold correction circuitry is provided for increasing the threshold component of the pulse signal by an amount proportional to the error signal in response to nonmovement of the actuator.

Still another object of the invention is to provide such a threshold correction circuit which repeatedly recomputes said corrected threshold signal component when the magnitude of the movement of the actuator in response to the pulse signals remains below a predetermined limit and when the error doesn't change direction but remains larger than the deadband.

Another object of the invention is to provide such a system in which the threshold correction circuit includes further circuitry for generating a second threshold correction signal proportional to the magnitude of the first movement of said actuator means to said pulse signal and reducing said threshold component as a function thereof.

BRIEF DESCRIPTION OF THE DRAWINGS

These and other objects, features and aspects of the invention will be more fully described and better understood in view of the following detailed description of the preferred embodiment taken in conjunction with the attached drawings wherein:

FIG. 1 is a system diagram of a control system for an electro-hydraulic actuator constructed in accordance with the invention;

FIGS. 2, 2(A), and 2(B) are graphs showing the relationship between the position error signal and pulse width signal and the effect of failure of the actuator to respond to the previous error correction signal;

DETAILED DESCRIPTION OF THE PREFERRED EMBODIMENTS

Figure 3:
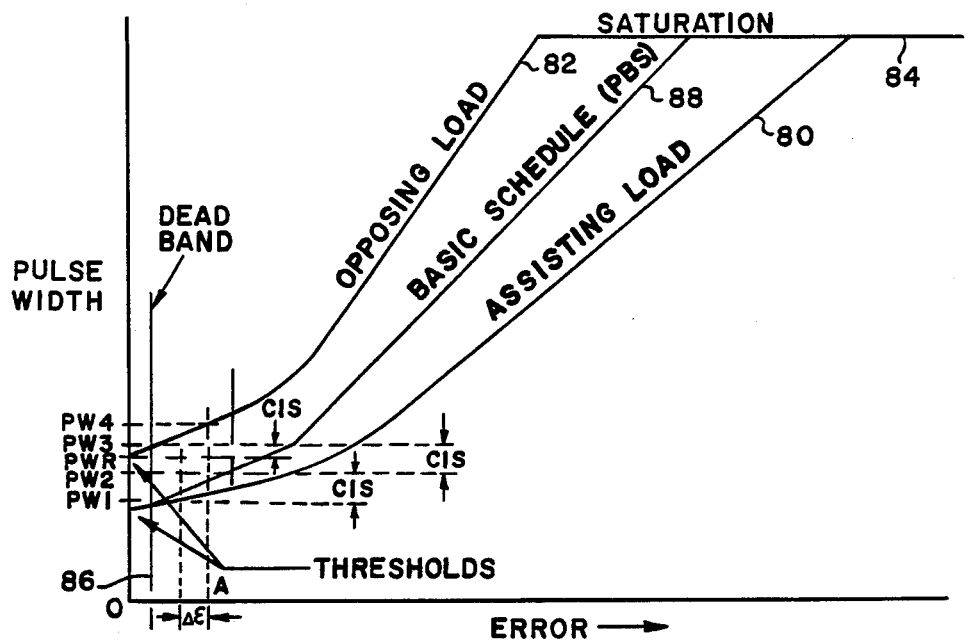
FIG. 3 is a graph showing the function of the threshold correction signal generating means when response to the previous pulse.

Referring first to FIG. 1, there is shown a closed loop actuator control system for an electro-hydraulic actuator used in a gas turbine engine fuel control system, the description of which is in substantial part repeated herein from U.S. Pat. No. 4,366,743 for completeness. The actuator control system is shown as part of a fuel control for exemplary purposes only and should not be limited in its uses by such description. Normally, this control can be utilized for many types of positioning requirements and is specifically adaptable to extensive aircraft applications. Similarly, electro-hydraulic or electro-pneumatic actuators other than that specifically illustrated can be controlled in the manner disclosed hereinafter.

The fuel control system regulates the fuel flow Wf to the gas turbine engine 50 shown in outline and comprises an electronic fuel controller 52, an actuator controller 54, an electro-hydraulic actuator 56, and a fuel valve 42. The electronic fuel controller 52 determines the required position of the fuel valve 42 and the actuator 56 does the positioning under the closed loop control of actuator controller 54. To accomplish this, the electronic fuel controller 52 samples at least one of the various operating parameters of the engine including, but not limited to, the compressor output pressure Pc, the ambient pressure Po, the turbine inlet temperature Ti, the ambient temperature To, and compressor rotor speed N. From the sampled parameters, the controller 52 calculates the position of the fuel valve 42 that will supply the engine with the correct fuel/air ratio.

The desired position of the fuel valve is transmitted to the actuator controller 54 as a position request signal PRS. This position yields the optimum fuel/air ratio for the operating conditions of the engine as sensed during one sampling interval. Along with the position signal, a clock or periodic timing signal CLS is transmitted to the actuator controller 54 to designate the sampling intervals. The actuator controller 54 compares the PRS signal to an actual position signal APS generated by a position sensor 40. The APS signal is representative of the actual position of the valve 42. The comparison forms an error signal PES which can be used to move the actuator 56 to position fuel valve 42, accordingly. Closed loop control is provided by generating a periodic pulse width modulated signal synchronous with the clock signal CLS to either solenoid 32 or solenoid 34 via signal lines 58, or 60, such that the actuator 56 positions the fuel valve in a step wise manner in a direction to null the error. The fuel valve position, as defined by the actuator piston, regulates the amount of fuel flow Wf delivered to the engine 50. The fuel valve is fed at a substantially constant pressure from a pressure regulator 44 via conduit 43. The pressure regulator 44 receives pressurized fuel from an engine-driven pump 46 drawing from a fuel source 48. The regulator recirculates part of the fuel delivered by the pump 46 back to its inlet to maintain a constant pressure head at its output. The actuator 56 is also fluidically connected to the regulator 44 via conduit 43 and receives the pressurized fuel at pressure Ps as a source of motive power. A return conduit 47 from the actuator 56 to the pump 46 is provided to return the fuel of pressure Pr when needed power has been extracted.

The electro-hydraulic actuator 56 is of the doser type having bilateral directional capability and a positional movement corresponding to the magnitude of doses of fluid applied thereto, these in turn being proportional to the duration of a pulse width modulated signal which controls the solenoid valves 32 and 34. Such an actuator and its alternatives are more fully described in the referenced Eastman application. The doser actuator is shown as having a housing 10 incorporating a pair of coaxial cylindrical bores 12 and 14 of unequal diameter. Positioned in bores 12 and 14 on the common shaft 16 which is connected to the desired device to be actuated (fuel valve 42), are a pair of pistons 18 and 20.

Pistons 18 and 20 in association with bores 12 and 14, define three control pressure chambers 22, 24, and 26. Chamber 24 communicates through a passage 28 in housing 10 with a source of hydraulic fluid or fuel under substantial pressure Ps. Chamber 26 communicates through a passageway 30 with the inlet side of the fluid pressure source 46 at pressure Pr.

Chamber 22 is a control pressure chamber at pressure Px varied by the action of a first normally closed source solenoid valve 32 which communicates with the high pressure Ps through passageway 28 and with a second normally closed return solenoid valve 34 which communicates with passageway 30 leading to the return pressure Pr. The areas of pistons 18 and 20 are designed such that at equilibrium the control pressure Px is intermediate between the supply pressure Ps and the return pressure Pr. Opening of the solenoid valve 32 meters high pressure fluid into the chamber 22, thereby causing the piston to move to the right as shown in the drawing and to stop when the valve closes. Similarly, opening of solenoid valve 34 meters fluid flow out of the chamber 22 to the return, causing the piston to move to the left and to stop again when the valve closes. The smallest discrete movements will occur for the shortest actuation pulses for solenoid valves 32 and 34.

Referring now to FIG. 2, there is shown graphically the relationship between the magnitude of the position error signal PES and the pulse width signal (PW) required to move the actuator 10 to a nulled or zero error position. It will be observed that the relationship comprises a family of curves which range between assisting load schedule 80 and a maximum opposing load schedule 82. Both error signal versus pulse width schedules have an upper limit at a saturation level 84 which corresponds to a pulse width of 100% of the pulse cycle time which therefore corresponds to actuator solenoid 32 or 34 being continuously on. At the other extreme of the position error signal versus pulse width schedule, there is a deadband area which corresponds to position error signals below LEL, line 86. Below the LEL error signal value, the actuator 10 does not respond, thereby obviating a constant cycling of the actuator about a 0 value. Nominally between the assisting load and the opposing load schedules 80 and 82 is a basic load schedule 88 which represents substantially an average or mean value of pulse width PW schedule versus PES. This schedule is incorporated in the actuator controller 54. The function of the controller 54 is fully described in U.S. Pat. No. 4,366,743 above-referenced. Basically, the controller receives a signal indicative of a desired position for the actuator and another signal from a position sensor 40 indicative of the present position of the actuator. From this, based upon the stored basic load schedule, the actuator controller generates a pulse signal having a pulse width in accordance with the schedule. This pulse is applied to one or the other of the solenoid valves 32 or 34 to move the actuator 10 in a direction to move the actuator from its natural position to the desired position.

In the above-referenced U.S. Patent, it is further recognized that, particularly in small position error signal regions, movement of the actuator 10 to bring the actuator position error signal PES within the lower error limit can be inappropriately slow this being primarily the result of differences between the actual or required error signal versus pulse signal for specific operating conditions and the basic schedule. It was therein proposed to provide an error signal correction signal wherein the correction signal was a resultant of non-movement of the actuator in response to a pulse and a counter signal indicative of the number of such ineffective pulses that occurred prior to first movement of the actuator.

Figure 5:
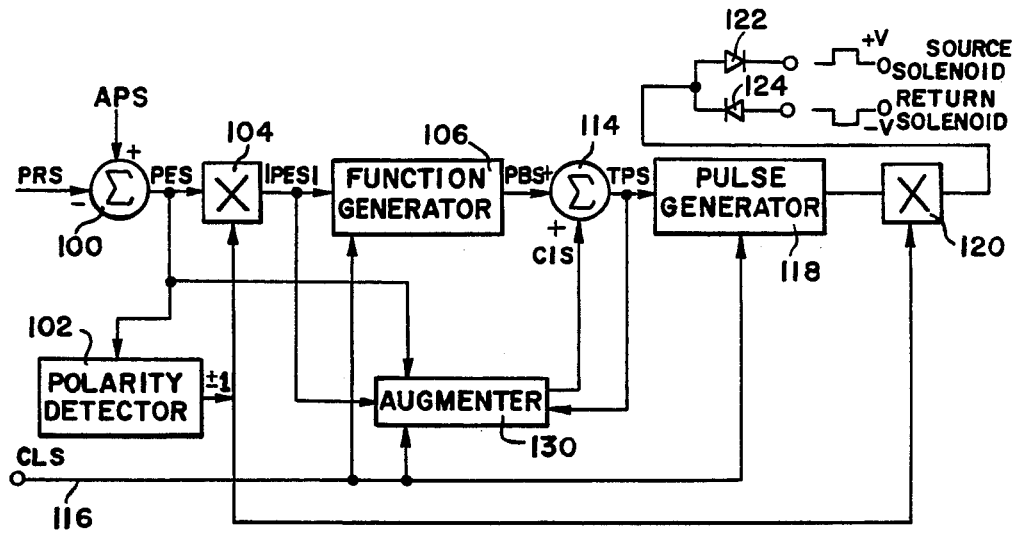
FIG. 5 is a more detailed block diagram of the actuator controller of FIG. 1.

In this prior art system, shown simplified and slightly modified in FIG. 5, the error signal is generated by a summing junction 100 receiving as inputs the position request signal PRS and the actual position signal APS.

These two signals are added in the summing junction 100 and form a position error signal PES of a certain magnitude and polarity. In the embodiment shown the polarity will be negative if the PRS signal is greater than the APS signal and positive if vice versa. Next, the position error signal PES is fed into a polarity detector 102 which generates a multiplicative factor of either a +1 or −1 depending on the polarity of the signal. If the PES signal is positive, a +1 is generated and if negative, a −1 is generated.

The polarity sensor output is fed back to a multiplication circuit 104 which has as an additional input the PES signal. This provides an error signal |PES| which is equal to the absolute value of the position error signal regardless of the original polarity. The |PES| signal is fed into a function generator 106 which operates to provide the base pulse width signal PBS from a schedule which is a function of the system error. The PBS signal is generated once every sampling period by feeding the function generator with the clock signal CLS via signal line 116. The particular function generated by the function generator 106 will be more fully described hereinafter.

The base pulse signal PBS is combined in another summing junction 114 with a correction signal CIS generated by augmenter circuit 130 described in detail below to form a total pulse signal TPS. The total pulse signal is representative of the desired duration of the pulse width for a particular clock period. The TPS signal is transmitted to the input of a pulse generator 118 where pulse width modulation takes place. The pulse generator 118 receives the timing signal CLS via signal line 116 to generate pulses at discrete sampling or timing intervals synchronously with the clock. The duration of the pulse is governed by the magnitude of the TPS signal. The pulse generator can be implemented as a monostable device which has an astable state regulated by the TPS signal. This device can have a fixed level output or it may include means for an initial "spike" of voltage to a high level followed by a reduction to a lower level for the remaining pulse duration. As is known, the "spike" reduces the threshold pulse width needed to open a solenoid valve.

The output pulses from the pulse generator 118 are transmitted to a multiplication circuit 120 which receives, as another input, the output of the polarity detector 102. The multiplication circuit multiplies the output pulse by either a +1 or −1 thereby generating pulses of +v, −v to govern the direction of the actuator position. The multiplier 120 coupled with a pair of commonly connected diodes 122, 124 performs a gating function to the solenoids. If the polarity of the error signal PES is negative (APS less than the position request signal PRS), the output of the pulse generator 118 is gated to the return solenoid 34 through diode 124 to move the actuator piston left. If the actual position signal APS is greater than the position request signal PRS, then polarity detector will output a +1 and the pulse output from generator 118 will be gated to the source solenoid 32 through diode 122 to move the piston right. The movement is in a direction calculated to null the difference between the PRS and APS signals.

Figure 6:
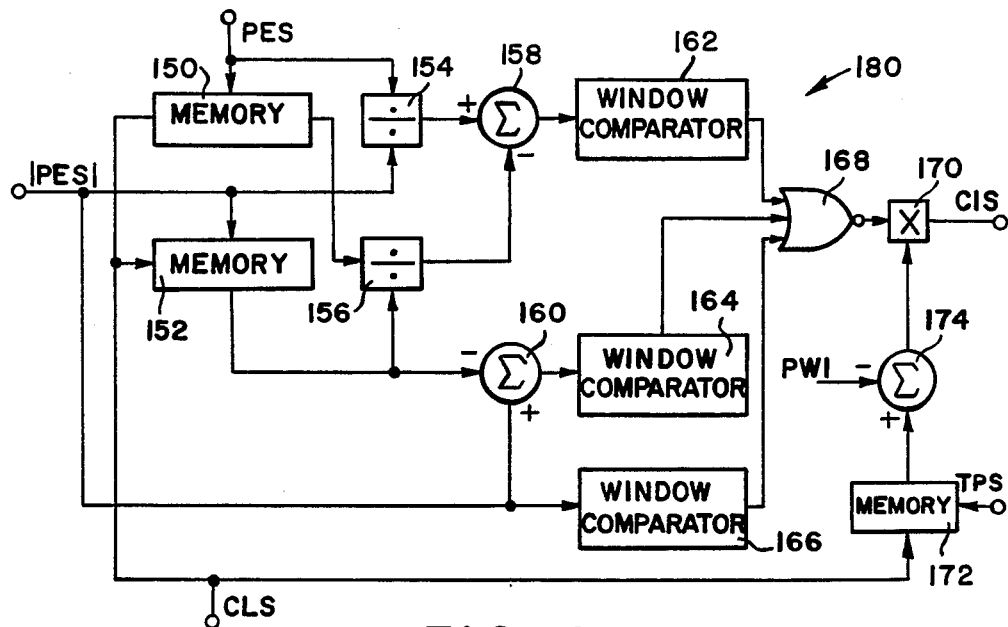
FIG. 6 is a detailed blocked diagram of the augmenter in FIG. 5 error signal generating means.

FIG. 5 differs from the equivalent FIG. 2 in U.S. Pat. No. 4,366,743 in the lumping together of the window comparator 108, the counter 110 and the multiplying digital to analog converter 112 in the latter figure as an augmenter 130 in FIG. 5, and in supplying this augmenter with the total pulse signal TPS. As the name suggests, this device augments the basic pulse signal PBS as needed to adapt to varying solenoid response thresholds. A first embodiment of the improved augmenter circuit is shown in FIG. 6.

The circuit has four separate inputs. The first input is the position error signal PES which is received by a memory 150 and a divider 154. Memory 150 stores the present error signal PES and outputs the previous error signal PES (tp) for every clock signal. The second signal input is the absolute value of the position error signal |PES| received by memory 152, divider 154, summation circuit 160, and a window comparator 166. The third input is the clock signal CLS input to the two memory elements 150 and 152. The fourth signal input is the total pulse signal TPS.

The output of the memory element 152 is fed to one input of the divider 156 and the other input of summation circuit 160. The second input to the divider 156 is transmitted from the output of memory 150. The output of the summation circuit 160 is transmitted to a second window comparator 164. The output of the two dividers 154 and 156 are differenced in a summation circuit 158 whose output is transmitted to a third window comparator 162.

The outputs of all three window comparators 162, 164, and 166, respectively, form bilevel logic signals for the input to the NOR gate 168. Absence of a high level signal on any of the window comparator outputs will produce a high output from the NOR gate 168 and transmit the signal to the multiplier circuit 170.

A third memory 172 is connected to receive and store the total pulse signal TPS previously applied to the actuator. Upon the occurrence of the next clock signal CLS, this signal is output to a summing junction 174. Simultaneously, the pulse width signal PW1 corresponding to the threshold pulse portion of the basic pulse schedule PBS in FIG. 2 is applied to another input of the summing junction 174 wherein it is subtracted from the TPS signal. This signal is now combined with the output from a NOR gate 168 which receives the outputs from the window comparators 162, 164, and 166 which are described in U.S. Pat. No. 4,366,743. Since this is a NOR gate, and based upon the previous logic, it will be seen that the NOR gate 168 outputs the signal only when incrementing of the threshold signal PW1 is needed. The output from the NOR gate is combined with the output from the summing junction 174 to provide the correction signal CIS. This signal is then combined with the output PBS from the function generator 106. The value of the previous (ineffective) pulse is seen to be substituted for the threshold portion PW1 of the basic pulse schedule PBS.

The function of the circuit can best be understood with reference to FIGS. 2, 2a and 2b. FIG. 2 depicts incrementing as described in the Leszczewski U.S. Pat. No. 4,366,743 where pulse width is plotted against scalar position error |PES|. If a pulse on the basic schedule does not exceed the solenoid response threshold, the schedule is increased by a small fixed increment with each sampling interval until response does occur. High resolution is assured, but converging into the deadband can be very slow, and accuracy in following slow transients can be poor. Note that following a pulse large enough to exceed the solenoid response threshold, the succeeding pulse will be back on the basic schedule even if the error is not fully corrected. In FIG. 2a, a small scalar position error signal $PES_1$ produces a pulse derived from the basic schedule 88 shown in dashed lines in FIGS. 2a and 2b. If this pulse is insufficient to cause movement of the actuator 10, a first correction signal $CIS_1$ is added to the base schedule pulse width PW1. This effectively shifts the basic schedule by an amount equal to $CIS_1$ to provide schedule 90. In FIG. 2b, a larger position error signal $PES_2$ occurs. Still assuming non-movement of the actuator 10, a substantially larger error correction signal $CIS_2$ is produced, it being apparent that the magnitude of the correction signal $CIS_2$ is proportional to the magnitude of the pulse error signal. This in effect shifts the base schedule from line 88 to new schedule 90.

The pulse width signal TPS applied to the actuator 10 is now seen to comprise an amount equivalent to the least solenoid response threshold $PW^1$ from the basic schedule 88 plus an additional amount proportional to doser actuator 10 position error signal PES. If the resulting pulse is not sufficient to produce a doser piston movement because it is below the solenoid valve threshold for the particular operating condition, its higher value is substituted for the least solenoid response threshold $PW^1$ in computing the required pulse width for the next sampling interval. If the solenoid valve continues to not respond, successive sampling intervals will assume response thresholds progressively increased by an amount proportional to position error. Note that when the pulse width finally exceeds the actual solenoid response threshold, it will exceed the threshold by an amount proportional to the last correction signal component CIS. This excess for small errors will be small enough to allow for good resolution while allowing more generous piston responses for larger errors.

This action is further illustrated in FIG. 3, where pulse width is again plotted against piston position error. The assisting and opposing load curves 80, 82 show the optimal pulse width to correct the error for the two extreme load conditions. The basic schedule 88 generally shows the average basic response curve contained in the actuator memory from which the controller generates its first response to an error signal. PW1 is approximately the least anticipated solenoid response threshold and the lowest pulse width value from the basic schedule. If it is assumed that the system is operating in a maximum opposing load situation and the controller is following a ramped position request which is just steep enough to maintain a constant error in spite of the piston movements caused by solenoid valve pulsing, the magnitude of these movements will then be a measure of actuator performance since they show how fast a request ramp can be followed without exceeding the error considered.

Figure 4:
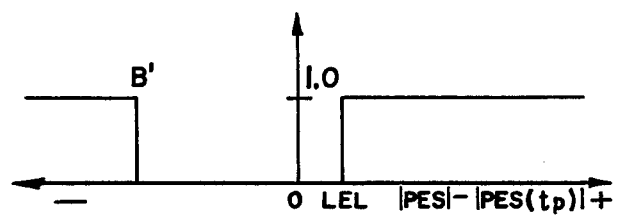
FIG. 4 is a graph showing the function of the gating means for determining when a correction should be made to the previously assumed threshold pulse width.

Window comparator 164 is modified to provide a response curve as shown in FIG. 4. This insures that incrementing of the pulse width signals is allowed to continue for error reducing responses that are less than some selected quantity B'. This value B' is selected to assure that cancellation of incrementing does not occur for small error changes and is simultaneously selected to assure that incrementing is cancelled when the response exceeds a predetermined maximum quantity B' above which error responses are large enough that precise computation of the solenoid threshold portion of the pulse signal TPS becomes both difficult and unnecessary.

The horizontal broken lines in FIG. 3 show total pulse width signals for successive incremental pulse additions following a failure of the piston to respond. If the maximum opposing load is in effect, then an error A will produce an initial subthreshold response PW2 from the basic schedule. At the succeeding sampling interval the position error signal is assumed the same and the added pulse increment CIS will increase the net or total pulse signal PW3 to become PW2+CIS where CIS=PW2−PW1. At the next clock cycle, the new TPS signal PW3 will exceed the required PWR threshold by an amount ΔPW and the position error is reduced by an amount ΔE. Incrementing of the pulse signal threshold component stops and for the sampling interval which occurs subsequently, the pulse signal will again equal PW2.

It can be seen that ideally, following a first pulse response ΔE, the threshold pulse used for computing the succeeding pulse width, instead of returning to PW1, should be made equal to PWR since this is the true threshold pulse value required for the particular operating conditions in effect. Then, the very next sampling interval will produce an effective pulse width PW4. If the threshold for control could be continually maintained at a value PWR, the desired position correction could be made for each sampling interval. The corresponding ramp slope (the position error A divided by the sampling interval) would then be ideal. Error could be accurately corrected thereafter without further incrementing until it is brought into the deadband or again increased.

Figure 7:
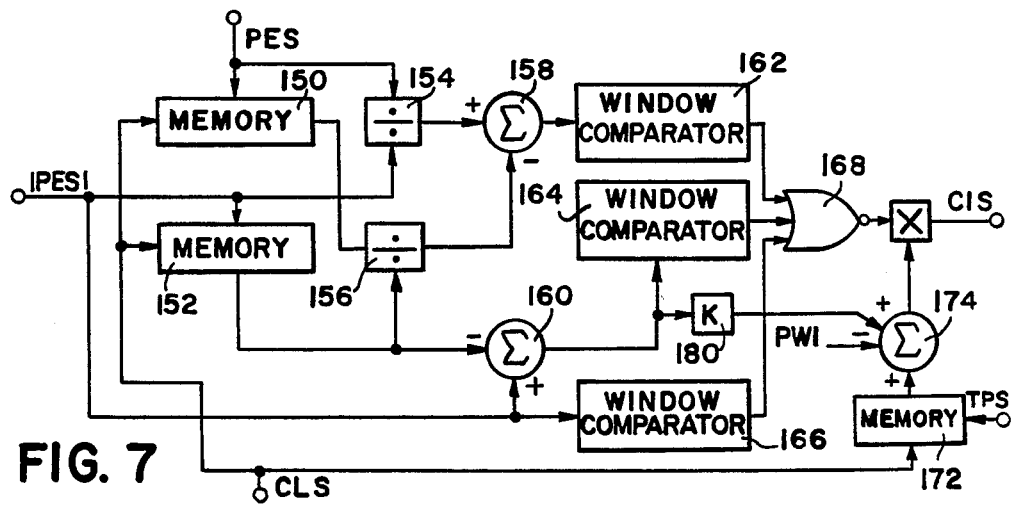
FIG. 7 is a detailed block diagram of a further modified embodiment of the error signal generating circuitry.

This correction can be effected with a further modified augmenter 130 as shown in FIG. 7. The control is as in FIGS. 5 and 6 wherein the augmenter 130 provides a correcting signal CIS when the basic pulse versus error schedule is inadequate. In the circuit of FIG. 7, the output TPS from the memory circuit 172 is again applied to the summing junction 174 and the value PW1 subtracted therefrom. Simultaneously, the input scalar position error signal |PES|, minus previous scalar position error signal |PES (pt)| supplied to window comparator 164 is adjusted by an appropriate gain multiplier K in an amplifier circuit 180 and this second correction signal value is input to the summing junction 174 to establish a further modified pulse augmenting or correction signal CIS. This second correcting signal is subtracted from the TPS minus PW1 signal. It will now be seen that the PW3 signal is reduced by an amount ΔPW that is proportional to the change in the error signal (ΔE) that resulted from the first total pulse signal TPS that produced the ΔE movement. The net effect is to reduce the corrected threshold signal by an amount which establishes the base minimum pulse threshold at the value PWR, the minimum pulse threshold required use for the particular operating conditions. Further, since the value B is selected to be in excess of an error signal A as shown in the attached FIG. 4, this value PWR will continue to be used as the minimum pulse threshold signal for computation of pulse width signals for any particular correction response occurring within the nonlinear (small error signal) region of the response curves.

In the above disclosure, it will now be seen that the improved augmenter circuits of the present invention will provide substantially improved actuator response in the small signal nonlinear region by effecting a larger pulse signal incrementing wherein the increments are proportional to the magnitude of the error signal, by assuring that the incremented or corrected minimum pulse signal is not cancelled until a significant actuator response occurs, and by providing a final correction of the pulse signal to establish the exact value of the minimum pulse threshold required for any particular operating condition utilizing this value until a particular error perturbation has been corrected.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. In a closed loop control system for an electrohydraulic actuator having means for generating a position signal representative of the position thereof and being movable in response to a time modulated pulse signal generated as a function of said position signal and a repeating clock signal, said pulse signal being based upon an error signal schedule representative of the difference between the actuator position and a requested actuator position, the time modulated pulse signal including a first threshold component and an error component proportional to said error signal, an augmenter signal generating circuit comprising: first comparator means for sensing non-movement of said actuator in response to a said pulse signal, first threshold correction signal generating means for generating a correction signal proportional to said error signal, said first threshold correction signal generating means including a storage circuit connected to receive and store the output from said control system, and a second summing circuit means being connected to subtract said first threshold component from said stored output for generating said threshold correction signal and first summing circuit means for adding said threshold correction signal to said pulse signal to generate a corrected pulse signal.

2. The augmenter signal generating circuit of claim 1 wherein said control system includes a first comparator circuit for generating first opposite binary signals in response to movement and non-movement of said actuator in response to said pulse signal, respectively, second comparator means for generating second opposite binary signals in response to a change and a non-change in direction of the position error of said actuator, and a gating circuit connected to receive said first and said second binary signals and said correction signal for outputting said correction signal in response to non-movement of said actuator and when the direction of the positional error of said actuator has not changed.

3. The augmenter signal generating of circuit for claim 2 wherein said gating circuit means includes a NOR gate.

4. The augmenter signal generating circuit of claim 3 wherein said first and said second comparator circuit means each include a window comparator.

5. The augmenter signal generating circuit of claim 4 further including third comparator means for receiving said error signal and generating third opposite binary signals in response thereto when the magnitude of said error signal is greater than and less than a predetermined minimum value.

6. In a closed loop control system for an electro-hydraulic actuator having means for generating a position signal representative of the position thereof and being movable in response to a time modulated pulse signal generated by said control system and a repeating clock signal, said pulse signal being based upon an error signal schedule representative of the difference between said position signal and a desired actuator position and including a threshold component and an error component proportional to said error signal, an augmenter signal generating circuit comprising first comparator means for generating first opposite binary signals when the magnitude of said error signal is above and below a predetermined minimum, second comparator means for generating second opposite binary signals in response to movement and non-movement of said actuator in response to a said pulse signal, third comparator circuit means for generating third opposite binary signals in response to movement of said actuator in the same and opposite directions, and a first threshold correction signal generating means for generating a threshold correction signal proportional to said error signal, and including a summing circuit for adding said first correction signal to said threshold component in response to said non-movement of said actuator to said pulse signal, and second correction signal generating means responsive to the first movement of the said actuator means in response to a corrected pulse signal for generating a second error correction signal proportional to the magnitude of said first movement, said summing circuit means being connected to receive said second correction signal for subtracting said second correction signal from said corrected pulse signal.

* * * * *